United States Patent
Thome

(10) Patent No.: US 8,331,118 B2
(45) Date of Patent: Dec. 11, 2012

(54) GENERATOR AND METHOD FOR GENERATING A DIRECT CURRENT HIGH VOLTAGE, AND DUST COLLECTOR USING SUCH GENERATOR

(75) Inventor: Caryl Thome, Saint Egreve (FR)

(73) Assignee: Sames Technologies, Meylan (FR)

( * ) Notice: Subject to any disclaimer, the term of this patent is extended or adjusted under 35 U.S.C. 154(b) by 736 days.

(21) Appl. No.: 12/522,455

(22) PCT Filed: Jan. 7, 2008

(86) PCT No.: PCT/FR2008/000019
§ 371 (c)(1),
(2), (4) Date: Oct. 6, 2009

(87) PCT Pub. No.: WO2008/099087
PCT Pub. Date: Aug. 21, 2008

(65) Prior Publication Data
US 2010/0043641 A1    Feb. 25, 2010

(30) Foreign Application Priority Data
Jan. 8, 2007   (FR) ..................................... 07 00074

(51) Int. Cl.
*H02M 3/24*      (2006.01)
*H02M 7/5387*    (2007.01)

(52) U.S. Cl. .......................................... 363/98; 363/132
(58) Field of Classification Search .................... 363/16, 363/17, 97, 98, 131, 132, 152–154
See application file for complete search history.

(56) References Cited

U.S. PATENT DOCUMENTS

| | | | | |
|---|---|---|---|---|
| 5,177,428 A | * | 1/1993 | Hirose et al. | 323/207 |
| 6,056,808 A | | 5/2000 | Krause | |
| 6,552,598 B2 | * | 4/2003 | Gelman | 327/453 |
| 6,711,037 B2 | * | 3/2004 | Odachi et al. | 363/98 |
| 6,795,287 B2 | * | 9/2004 | Kim et al. | 361/109 |
| 6,836,416 B2 | * | 12/2004 | Ishihara et al. | 363/132 |
| 2006/0278080 A1 | | 12/2006 | Li et al. | |

FOREIGN PATENT DOCUMENTS

| | | |
|---|---|---|
| DE | 3523622 A1 | 1/1986 |
| DE | 102004029901 A1 | 1/2006 |

* cited by examiner

*Primary Examiner* — Matthew Nguyen
(74) *Attorney, Agent, or Firm* — Browdy and Neimark, PLLC

(57) ABSTRACT

The invention relates to a direct-current high-voltage generator that comprises: current unidirectional switches (74, 76); a driver unit (130) capable of controlling the switching operation from an on-state to an off-state of a switch (74) only when a switch connected in parallel is in the on-state.

12 Claims, 3 Drawing Sheets

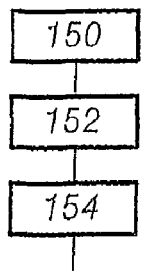
Fig. 3
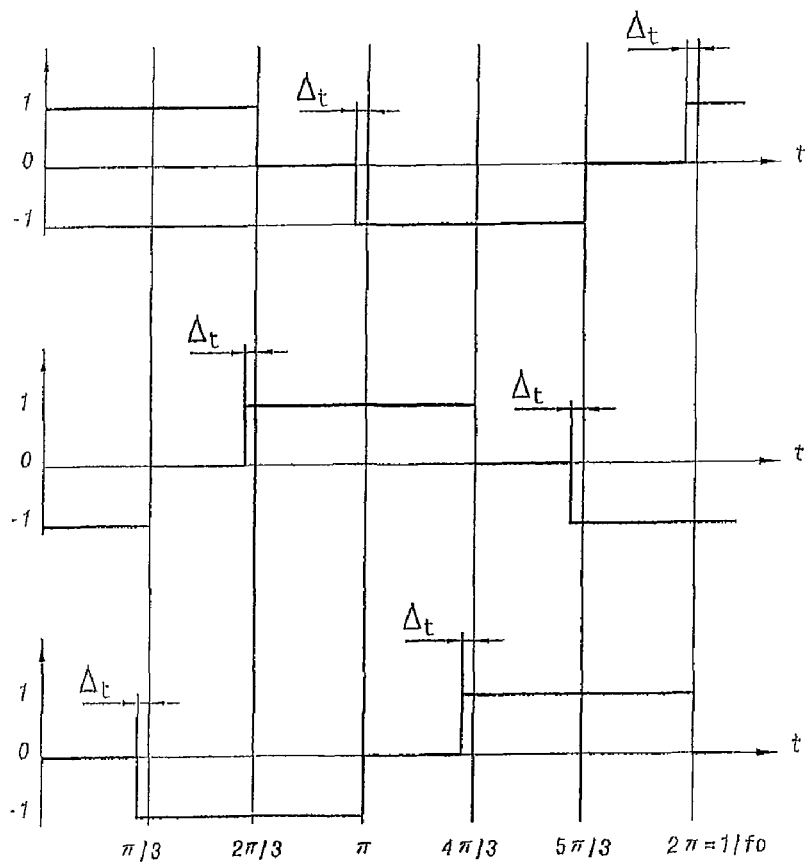
Fig. 4
Fig. 5
Fig. 6

GENERATOR AND METHOD FOR GENERATING A DIRECT CURRENT HIGH VOLTAGE, AND DUST COLLECTOR USING SUCH GENERATOR

The present invention relates to a high direct current (DC) voltage generator and to a method of generation, and also to a dust precipitator using the generator.

High DC voltage generators exist that comprise:

a current switch unit suitable for receiving as input a direct current and for delivering as output polyphase voltage and current made up of N periodic currents phase offset relative to one another, the phase offsets of the N periodic currents being uniformly distributed over the range 0 to $2\pi$ radians, where $2\pi$ corresponds to one period of the fundamental frequency $f_0$ of the periodic currents, and N is an integer greater than or equal to three, the switch unit having N branches connected in parallel between DC input and output points, each branch being formed by a top half-branch and a bottom half-branch connected in series via a midpoint, each midpoint delivering a respective one of the phase-offset periodic currents of the polyphase current, each top or bottom half-branch including a controllable switch suitable for switching between an off state in which no current can flow through said half-branch and an on state in which current can flow through said half-branch in either direction;

a transformer connected to the output of the switch unit, the transformer being suitable for transforming the polyphase voltage into a polyphase high voltage of greater amplitude;

a rectifier connected to the secondary of the transformer, the rectifier being suitable for transforming the polyphase high voltage from the transformer into a rectified high voltage; and a control unit for controlling the switches of the switch unit.

In such existing generators, the switches of the current switch unit are bidirectional, i.e. they pass current in both directions.

Existing high DC voltage generators operate in satisfactory manner. Nevertheless, at present, it is desirable to improve the electrical efficiency of such power generators and to do so in a configuration that is more compact and less heavy.

The invention seeks to propose a high DC voltage generator presenting improved electrical efficiency and improved power per unit mass in watts per kilogram (W/kg).

The invention thus provides a high DC voltage generator in which:

each switch comprises a controllable transistor connected in series with a diode so as to form a unidirectional current switch, current being capable of flowing in the on state only from the positive terminal towards the negative terminal; and the control unit is suitable for:
  causing a switch of a top half-branch to switch from the on state to the off state solely at an instant when a switch of another top half-branch is in the on state; and
  causing a switch of a bottom half-branch to switch from the on state to the off state solely at an instant when a switch of another bottom half-branch is in the on state.

In the above generator, the DC received from a current source is never interrupted since a switch passes from the on state to the off state only if a switch connected in parallel allows the DC to continue flowing. By never interrupting the DC, it is possible to avoid voltage peaks, and thus to avoid the presence of current harmonics and the need for devices to filter such peaks. This ends up by making it possible to reduce the overall size of the generator and to improve its efficiency. The current source also makes it possible to overcome the imperfections of the transformer that serves to charge capacitors via respective diodes.

In addition, in order to avoid parasitic coupling between the primary windings, the presence of unidirectional current switches makes it possible to avoid a short circuit current flowing in a primary winding of the transformer when two switches in two top branches, or in two bottom branches, are simultaneously in the on state. By preventing such a short circuit current occurring, the current harmonics are limited and the electrical efficiency of the generator is improved.

Embodiments of the generator may include one or more of the following characteristics:

the control unit is suitable for causing each switch to pass from the on state to the off state and from the off state to the on state only once per period $1/f_0$;

the control unit is suitable for maintaining each switch in the on state for no more than:

$$\frac{2\pi}{N} + \frac{\pi}{2N};$$

the fundamental frequency $f_0$ is greater than 1 kilohertz (kHz);

the rectifier comprises at least one rectifier and voltage-multiplier stage, each stage comprising:

N input points $E_{1i}$, each input point $E_{1i}$ being connected to the $i^{th}$ phase of the high voltage from the transformer without passing via a unidirectional current switch, i being an integer number lying in the range 1 to N;

an input point $E_2$ connected to the neutral of the polyphase high voltage without passing via a unidirectional current switch;

N outlet points $S_{1i}$, each output point $S_{1i}$ being connected to the $i^{th}$ phase of the polyphase high voltage without passing via a unidirectional current switch;

an output point $S_2$ connected to the neutral of the polyphase high voltage without passing via an unidirectional current switch, the output point being an output point for rectified and multiplied DC voltage;

N capacitors $C_{1i}$, each capacitor $C_{1i}$ being connected between the input $E_{1i}$ and the output point $S_{1i}$ without passing via a unidirectional current switch;

N unidirectional current switches $I_{1i}$, each switch $I_{1i}$ being connected between the output points $S_2$ and $S_{1i}$ without passing via a capacitor, the switch $I_{1i}$ allowing current to flow solely from the output point $S_2$ to the output point $S_{1i}$ when the rectified and multiplied voltage is negative, or in the opposite direction when the rectified and multiplied voltage is positive;

a capacitor $C_2$ connected without passing via a unidirectional current switch between the input point $E_2$ and the output point $S_2$; and N unidirectional current switches $I_{2i}$, each switch $I_{2i}$ being connected without passing via a capacitor between the output point $S_{1i}$ and the input point $E_2$, the switch $I_{2i}$ allowing current to flow solely from the capacitor $C_{1i}$ to the capacitor $C_2$ for a rectified and multiplied voltage that is negative, or in the opposite direction for the rectified and multiplied voltage that is positive;

the rectifier comprises at least first and second rectifier and multiplier stages connected in series, i.e. the output points $S_{1i}$ and $S_2$ of the first stage are connected directly respectively to the input points $E_{1i}$ and $E_2$ of the second stage, and the generator includes a high DC voltage selector suitable for connecting the output point $S_2$ of the first stage to a high DC voltage output terminal, or alternatively, the output point $S_2$ of the second stage to the same high DC voltage output terminal;

N is equal to three and wherein the transformer has three primary windings connected in a delta configuration, each primary winding being connected to a respective phase of the polyphase current delivered by the current switch unit, and wherein the transformer has three secondary windings connected in a star configuration, each secondary winding delivering a respective phase of the polyphase high voltage; and the time interval between the instant when a switch of a top branch or a bottom branch passes from the off state to the on state and the instant when a switch of another top or bottom branch, as the case may be, passes from the on state to the off state is less than:

$$\frac{1}{3f_0 N}.$$

These embodiments of the generator also present the following advantages:

switching each switch from the on state to the off state and vice versa no more than once per period $1/f_0$ limits the switching number and thus the harmonics generated by the generator;

keeping the unidirectional current switches on for no more than $$\frac{2\pi}{N} + \frac{\pi}{2N}$$

eliminates current harmonics at the frequency $3f_0$;

selecting an operating frequency for the switch unit that is greater than 1 kHz enables the transformer and the generator to be more compact;

the structure of the rectifier built up from unidirectional switches $I_{1i}$ and $I_{2i}$ together with the help of capacitors $C_{1i}$ and $C_2$ enables the voltage to be rectified and multiplied simultaneously in simple manner;

the use of a high DC voltage selector makes it simple to generate a plurality of different high DC voltages while delivering the same electrical power;

using a delta configuration for the primary of the transformer and a star configuration for the secondary of the transformer serves to decrease current harmonics and to have a neutral point for the secondary; and selecting the time between the instant at which two controllable switches situated on two different top branches (or two different bottom branches) switch from the on state to the off state to be shorter than $1/(3Nf_0)$ serves to reduce current harmonics.

The invention also provides a method of generating a high DC voltage with the help of the above generator, the method comprising:

causing a switch of a top half-branch to switch from the on state to the off state solely at an instant when a switch of another top half-branch is in the on state; and causing a switch of a bottom half-branch to switch from the on state to the off state solely at an instant when a switch of another bottom half-branch is in the on state.

Finally, the invention also provides an electrostatic dust precipitator comprising:

the above high DC voltage generator;

at least one electrode suitable for ionizing dust present in smoke, the electrode being connected to the high voltage generator; and at least one plate suitable for attracting ionized dust, the plate being connected to a reference potential.

The invention can be better understood on reading the following description given purely by way of non-limiting example and made with reference to the drawings, in which:

FIG. 3 is a flow chart of a method of generating high DC voltage with the FIG. 2 generator; and FIGS. 4 to 6 are timing charts of signals for controlling switches in the FIG. 2 generator.

In the figures, the same references are used to designate the same elements.

In the description below, characteristics and functions that are well known to the person skilled in the art are not described in detail.

Figure 1:
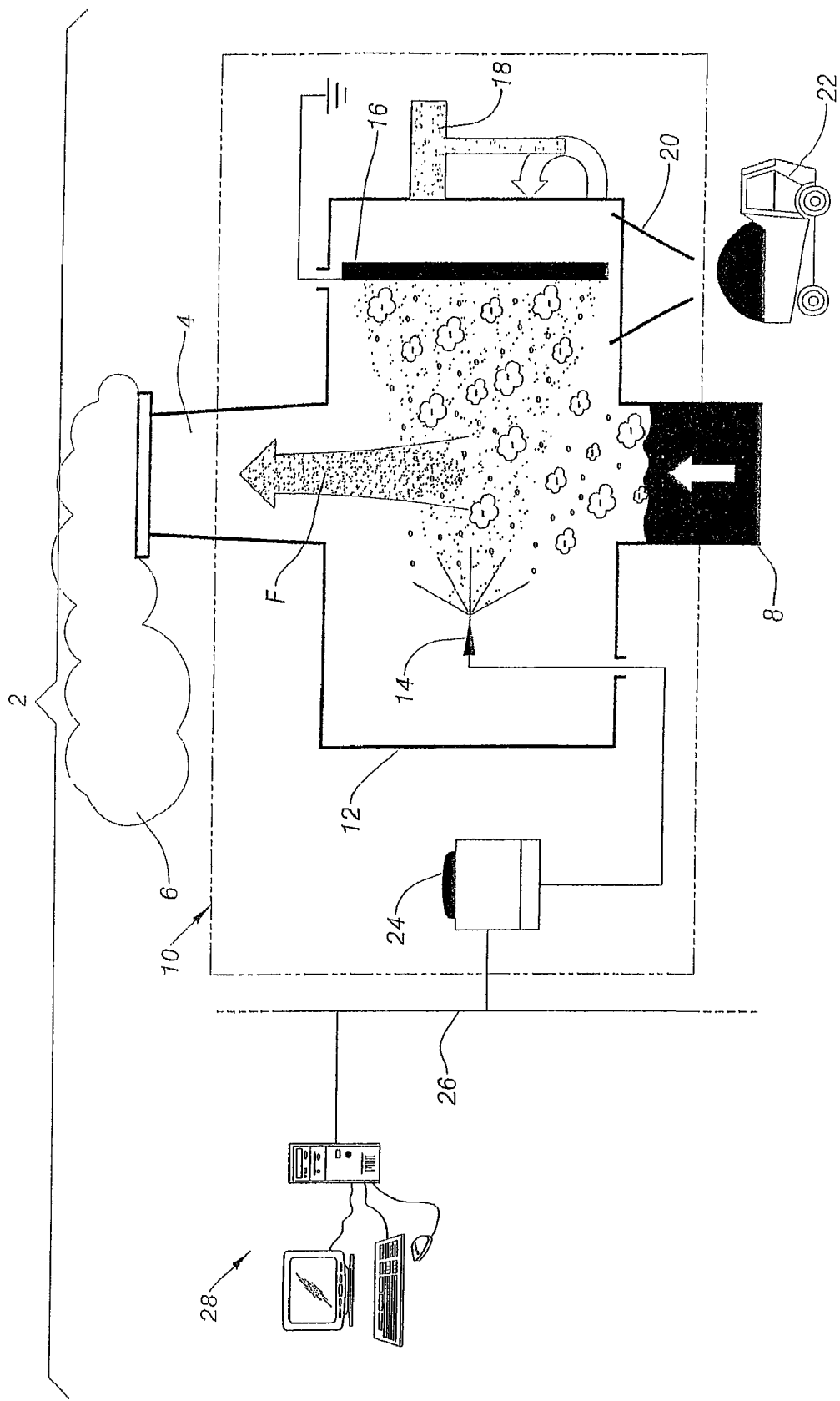
FIG. 1 is a diagrammatic view of an electrostatic dust precipitator using a high DC voltage generator.

FIG. 1 shows an industrial installation 2 fitted with a chimney 4 that projects dust-depleted smoke 6 into the atmosphere. The installation 2 also has a duct 8 in which the dust-charged smoke flows. Between the duct 8 and the chimney 6 there is interposed at least one enclosure of an electrostatic dust precipitator 10. The dust precipitator 10 is suitable for eliminating a large fraction of the dust present in the smoke before it is exhausted via the chimney 4.

Generally, a dust precipitator is made up of a plurality of enclosures through which the smoke passes in succession for removal of its dust. These enclosures are also known as "fields". To simplify FIG. 1, only one enclosure 12 is shown. The enclosure 12 is in fluid connection on one side with the duct 8 and on the other side with the chimney 4.

The enclosure 12 comprises:

an electrode 14 suitable for ionizing the dust present in the smoke; and a plate 16 connected to a reference potential, e.g. to ground, in this example, and on which the ionized dust becomes deposited.

In FIG. 1, the ionized dust is represented by small clouds having the symbol "-" marked therein.

The flow direction of the smoke through the enclosure 12 is represented by an arrow F.

The dust precipitator 10 also includes a hammer 18 suitable for striking one face of the plate 16 to separate the dust that has accumulated on the opposite face of the plate 16.

A hopper 20 is located vertically below the plate 16 so as to collect the dust that becomes separated when the plate 16 is struck by the hammer 18.

The hopper is designed to guide the separated dust towards a container, such as the skip of a truck 22, for example.

The electrode 14 is electrically connected to a negative high DC voltage generator 24. The term "high voltage" is used herein to designate a DC voltage of amplitude in absolute value that is greater than 10 kilovolts (kV). Preferably, the absolute value of the high DC voltage generated is less than 500 kV.

Typically, the generator 24 is connected via a data transmission network 26 to a supervisor 28 suitable for controlling the operation of the dust precipitator 10.

Figure 2:
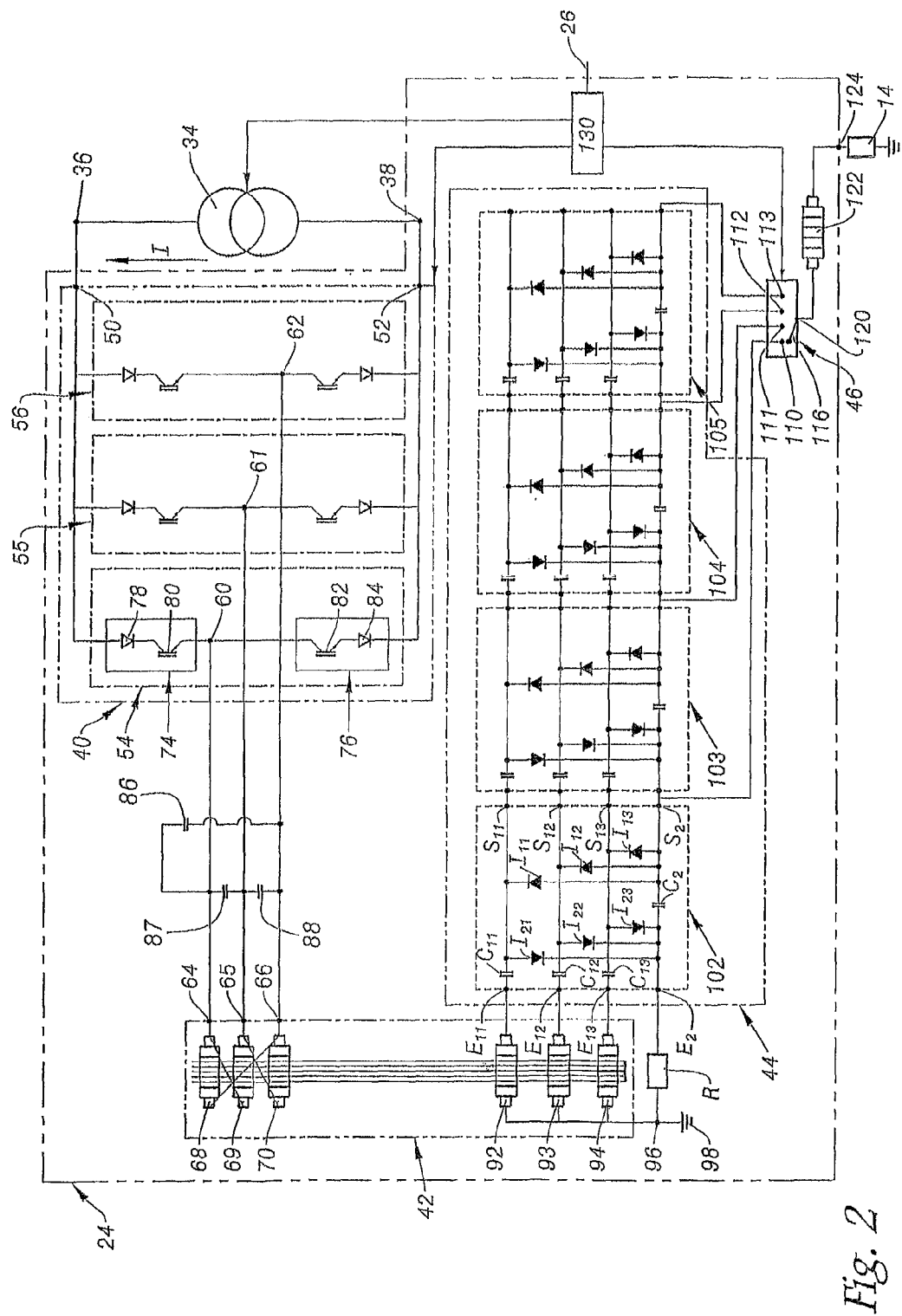
FIG. 2 is an electronic schematic diagram showing the principle of the high DC voltage generator used in the FIG. 1 dust precipitator.

FIG. 2 shows the generator 24 in greater detail.

Typically, the generator 24 is connected to a controllable DC source 34. For example, the source 34 is a three-phase rectifier followed by a chopper suitable for generating DC with low ripple (<30%) from three-phase alternating current (AC) delivered by an electricity power network. Here the electricity power network is a network distributing three-phase AC at a voltage lying in the range 300 volts AC (Vac) to 400 Vac, and at a frequency lying in the range 50 hertz (Hz) to 60 Hz.

Typically, the source is incorporated in the same housing as that containing the generator 24.

The DC delivered by the source 34 is represented by an arrow I.

The source 34 has a positive terminal 36 and a negative terminal 38.

The generator 24 comprises in succession:
a current switch unit 40 suitable for generating three-phase AC;
a transformer 42 suitable for generating three-phase AC at high voltage from the three-phase AC generated by the switch unit 40;
a rectifier-multiplier 44 suitable simultaneously for rectifying and multiplying the high voltage three-phase AC generated by the transformer 42 so as to produce a rectified and multiplied DC voltage; and
a selector 46 suitable for selecting the rectified and multiplied DC voltage for transmission to the electrode 14 as the negative high DC voltage.

The switch unit 40 has an input point 50 and an output point 52 for DC that are connected respectively to the positive and negative terminals 36 and 38.

The switch unit 40 also has three switching branches 54 to 56 connected in parallel between the points 50 and 52.

Each branch 54 to 56 has a midpoint given a respective reference 60 to 62.

The midpoints 60 to 62 are connected respectively to the ends 64 to 66 of respective primary windings 68 to 70 of the transformer 42.

The branches 54 to 56 are identical to one another except that their respective midpoints 60 to 62 are connected to different primary windings of the transformer 42. Thus only the branch 54 is described in detail below.

The branch 54 comprises a top half-branch connected between the point 60 and the point 50, and a bottom half-branch connected between the point 60 and the point 52. The top half-branch and the bottom half-branch have respective controllable switches referenced 74 and 76, that convey current in one direction only.

By way of example, the switch 74 is constituted by a diode 78 connected in series with an insulated gate bipolar transistor (IGBT) 80. The anode of the diode 78 is connected to the point 50 while the cathode of the diode 78 is connected of the collector of the transistor 80. The emitter of the transistor 80 is connected to the midpoint 60.

In similar manner, the switch 76 is constituted, for example, by an IGBT 82 connected in series with the diode 84. The collector of the transistor 82 is connected to the midpoint 60 and the emitter of the transistor is connected to the anode of the diode 84. The cathode of the diode 84 is connected to the point 52.

Capacitors 86 to 88 are connected in parallel between the respective terminals of the primary windings 68 to 70. The capacitance of the capacitors 86 to 88 is selected to attenuate the leakage self-inductance effect and to improve the electromagnetic compatibility (EMC) behavior of the transformer.

The primary windings 68 to 70 of the transformer 42 are connected in a delta configuration. The primary windings are magnetically coupled by the magnetic core 90 to three secondary windings 92 to 94 connected in a star configuration. The ends of the secondary windings 92 to 94 that are connected together are themselves connected to a neutral point 96, in turn connected to ground 98.

The turns ratio n between the secondary and primary windings is greater than ten such that the amplitude of the phase to ground voltage is raised by a factor of at least ten. In this example, the ratio n is selected to be greater than or equal to 27.

The other ends of the secondary windings 92 to 94 are directly connected to respective inputs $E_{11}$, $E_{12}$, and $E_{13}$ of a first stage 102 of the rectifier-multiplier 44.

The rectifier-multiplier 44 is made up of a plurality of stages connected in series. For example, four stages 102 to 105 are shown here. Each stage multiplies the three-phase voltage present at its inputs by a predetermined coefficient K.

The stage 102 has three input points $E_{11}$, $E_{12}$, $E_{13}$ and an input $E_2$ that is connected to the neutral point 96 via a resistor R of low resistance that serves as a shunt for measuring current.

The stage 102 also has four output points $S_{11}$, $S_{12}$, $S_{13}$, and $S_2$.

Finally, the stage 102 comprises:
three capacitors $C_{11}$, $C_{12}$, and $C_{13}$ each having one plate connected directly to a respective input point $E_{1i}$, $E_{12}$, or $E_{13}$, and having its other plate directly connected to a respective output point $S_{11}$, $S_{12}$, or $S_{13}$;
three diodes respectively referenced $I_{11}$, $I_{12}$, and $I_{13}$, each having its cathode connected directly to a respective input point $S_{11}$, $S_{12}$, and $S_{13}$, and having its anode directly connected to the output point $S_2$;
a capacitor $C_2$ connected directly on one side to the input point $E_2$ and on the other side to the output point $S_2$; and
three diodes $I_{21}$, $I_{22}$, and $I_{23}$ each having its anode directly connected to a respective output point $S_{11}$, $S_{12}$, or $S_{13}$, and having its cathodes directly connected to the input point $E_2$.

The diodes $I_{11}$, $I_{12}$, $I_{13}$, $I_{21}$, $I_{22}$, and $I_{23}$ form unidirectional switches suitable for passing current in one direction only.

Here, the orientation of the diodes in the stage 102 is selected to generate a negative rectified and multiplied voltage at the output $S_2$.

The following stages 103 to 105 are identical to the stage 102 and they are connected in series one after another. By "connected in series", it should be understood that the input points $E_{11}$ to $E_{13}$ and $E_2$ of the following stage are connected respectively to the output points $S_{11}$ to $S_{13}$ and $S_2$ of the preceding stage.

The output points $S_2$ of each of these stages are connected to respective input points 110 to 113 of the selector 46.

The selector 46 comprises a controllable switch 116 that can be switched between a plurality of positions to connect a selected one of the input points 110 to 113 to an output terminal 120 for high DC voltage.

The output 120 is connected via a choke impedance 122 to a high DC voltage output 124 of the generator 24.

The choke impedance 122 is formed by a resistor and an inductor configured to limit the magnitude of the current in the event of a short circuit between ground and the output 124.

The output 124 is connected to the electrode 14.

Finally, the generator 24 includes a control unit 130. This unit 130 is suitable, in particular, for controlling the various controllable switches of the switch unit 40 and for controlling the selector 46. Furthermore, the unit 130 in this example is also suitable for controlling the source 34 so as to control the amplitude I of the DC and its voltage.

The unit 130 is connected via the network 26 to the supervisor 28 so that the operation of the generator 24 can be remotely controlled by the supervisor 28.

The operation of the generator 24 is described below with reference to the method of FIG. 3.

Initially, during a step 150, the unit 130 adjusts the source 34 so as to set the amplitude I of the DC.

This also serves to perform some of the adjustment of the amplitude of the high DC voltage generated by the generator 24.

Thereafter, in a step 152, the unit 130 controls the selector 46 to connect one of its input points 110 to 113 to the output point 120. This enables the value of the high DC voltage delivered by the generator 24 to be selected. Nevertheless, it should be observed that unlike the action on the amplitude of the DC, the electrical power delivered by the generator 24 is independent of the position of the switch 116 in the selector 46. The selector 46 thus serves to select a high DC voltage while delivering the same power via the output 124.

Once the high DC voltage has been selected, in a step 154, the unit 130 causes the switches of the branches 54 to 56 of the switch unit 40 to switch in accordance with the timing charts given in FIGS. 4 to 6.

FIGS. 4 to 6 represent the switching of the switches in the branches 54 to 56, respectively. In these figures, the abscissa axis represents time t. The ordinate axis represents the state in which the switches are to be found. More precisely, when the signal is equal to "1", the switch in the top half-branch is on and the switch on the bottom half-branch is off. When the signal takes the value "0", the switches in both the bottom and the top half-branches are off. Finally, when the signal takes the value "−1", the switch in the top half-branch is off and the switch in the bottom half-branch is on.

The FIGS. 4 to 6 show only one period $1/f_0$ of the operation of the switch unit. This period corresponds to the value $2\pi$ shown in the figures. As shown in the timing charts of FIGS. 4 to 6, the switches of the switch unit 40 are subjected to full-wave control, i.e. each switch is switched from the on state to the off state and from the off state to the on state, once only per period. Furthermore, the unit 130 causes a switch in a top half-branch to switch from the on state to the off state only while a switch in another top half-branch is already in the on state so as to avoid interrupting the direct current. The unit 130 applies the same strategy for the switches in the bottom half-branches. Thus, the direct current generated by the source 34 is never interrupted.

Furthermore, in order to limit current harmonics, the time between switching a switch of a top half-branch from the off state to the on state precedes the time of a switch of another top half-branch switching from the on state to the off state by an interval $\Delta t$. The internal $\Delta t$ is selected to be small relative to the operating period $1/f_0$. Typically, the interval $\Delta t$ is selected to be less than $$\frac{1}{3f_0 N}$$

and preferably less than $$\frac{1}{10f_0 N},$$

where N is the number of phases of the polyphase current generated by the switch unit 40. In FIGS. 4 to 6, the interval $\Delta t$ is shown exaggerated so that it can be seen. The same applies for the switching of the switches in the bottom half-branches.

Finally, the time during which each switch is in the on state is selected to be equal to $$\frac{2\pi}{3} + \Delta t$$

so that the DC I consumed by the switch unit is permanent.

Typically, the fundamental frequency $f_0$ at which the switch unit 40 operates lies in the range 1 kilohertz (kHz) to 1 megahertz (MHz). Preferably, the frequency $f_0$ is selected to be equal to the parallel resonant frequency of the transformer 42.

It is recalled that the parallel resonant frequency is the frequency at which the unloaded impedance seen by a primary winding of the transformer is at a maximum. At this frequency, the transformer consumes its minimum magnetizing current.

Here, the frequency $f_0$ is greater than 10 kHz and less than 100 kHz.

Numerous other embodiments are possible. For example, the unidirectional switches of the switch could be made with thyristors. The diode 78 could be upstream or downstream from the IGBT 80.

The rectifier-multiplier 44 may be replaced by a simple rectifier not having any ability to multiply the DC. The number of stages of the rectifier-multiplier selected in series is arbitrary. Nevertheless, it is preferably less than twelve.

It is possible to adapt the generator 24 so that it produces a positive high DC voltage instead of a negative high DC voltage. For this purpose, it suffices to replace the diodes $I_{11}$, $I_{12}$, $I_{13}$, $I_{21}$, $I_{22}$, and $I_{23}$ by diodes that are identical but connected the opposite way round.

Finally, the switch unit 40 can easily be adapted to generate a polyphase current having more than three phases. In such an embodiment, the transformer 42 and the rectifier-multiplier 44 should be adapted correspondingly.

The invention claimed is:

1. A high DC voltage generator, the generator comprising:
   a current switch unit (40) suitable for receiving as input a direct current and for delivering as output polyphase voltage and current made up of N periodic currents phase offset relative to one another, the phase offsets of the N periodic currents being uniformly distributed over the range 0 to $2\pi$ radians, where $2\pi$ corresponds to one period of the fundamental frequency $f_0$ of the periodic currents, and N is an integer greater than or equal to three, the switch unit having N branches (54-56) connected in parallel between DC input and output points (50, 52), each branch being formed by a top half-branch and a bottom half-branch connected in series via a midpoint (60-62), each midpoint delivering a respective one of the phase-offset periodic currents of the polyphase current, each top or bottom half-branch including a controllable switch (74, 76) suitable for switching between an on state in which current can flow through said half-branch and an off state in which no current can flow through said half-branch in either direction;
a transformer (42) connected to the output of the switch unit (40), the transformer being suitable for transforming the polyphase voltage into a polyphase high voltage of greater amplitude;
a rectifier (44) connected to the secondary of the transformer (42), the rectifier being suitable for transforming the polyphase high voltage from the transformer into a rectified high voltage; and
a control unit (130) for controlling the switches of the switch unit, wherein:
each switch (74, 76) comprises a controllable transistor connected in series with a diode so as to form a unidirectional current switch, current being capable of flowing in the on state only from the positive terminal towards the negative terminal; and
said control unit (130) is suitable for:
causing a switch (74) of a top half-branch to switch from the on state to the off state solely at an instant when a switch of another top half-branch is in the on state; and
causing a switch (76) of a bottom half-branch to switch from the on state to the off state solely at an instant when a switch of another bottom half-branch is in the on state.

2. The generator according to claim 1, wherein the control unit (130) is suitable for causing each switch (74, 76) to pass from the on state to the off state and from the off state to the on state only once per period $1/f_0$.

3. The generator according to claim 1, wherein the control unit (130) is suitable for maintaining each switch in the on state for no more than:

$$\frac{2\pi}{N} + \frac{\pi}{2N}.$$

4. The generator according to claim 1, wherein the fundamental frequency $f_0$ is greater than 1 kHz.

5. The generator according to claim 1, wherein the rectifier (44) comprises at least one rectifier and voltage-multiplier stage (102-105), each stage comprising:
N input points $E_{1i}$, each input point $E_{1i}$ being connected to the $i^{th}$ phase of the high voltage from the transformer without passing via a unidirectional current switch, i being an integer number lying in the range 1 to N;
an input point $E_2$ connected to the neutral of the polyphase high voltage without passing via a unidirectional current switch;
N outlet points $S_{1i}$, each output point $S_{1i}$ being connected to the $i^{th}$ phase of the polyphase high voltage without passing via a unidirectional current switch;
an output point $S_2$ connected to the neutral of the polyphase high voltage without passing via an unidirectional current switch, the output point being an output point for rectified and multiplied DC voltage;
N capacitors $C_{1i}$, each capacitor $C_{1i}$ being connected between the input $E_{1i}$ and the output point $S_{1i}$ without passing via a unidirectional current switch;
N unidirectional current switches $I_{1i}$, each switch $I_{1i}$ being connected between the output points $S_2$ and $S_{1i}$ without passing via a capacitor, the switch $I_{1i}$ allowing current to flow solely from the output point $S_2$ to the output point $S_{1i}$ when the rectified and multiplied voltage is negative, or in the opposite direction when the rectified and multiplied voltage is positive;
a capacitor $C_2$ connected without passing via a unidirectional current switch between the input point $E_2$ and the output point $S_2$; and
N unidirectional current switches $I_{2i}$, each switch $I_{2i}$ being connected without passing via a capacitor between the output point $S_{1i}$ and the input point $E_2$, the switch $I_{2i}$ allowing current to flow solely from the capacitor $C_{1i}$ to the capacitor $C_2$ for a rectified and multiplied voltage that is negative, or in the opposite direction for the rectified and multiplied voltage that is positive.

6. The generator according to claim 5, wherein the rectifier (44) comprises at least first and second rectifier and multiplier stages (102-105) connected in series, i.e. the output points $S_{1i}$ and $S_2$ of the first stage are connected directly respectively to the input points $E_{1i}$ and $E_2$ of the second stage, and wherein the generator includes a high DC voltage selector (46) suitable for connecting the output point $S_2$ of the first stage to a high DC voltage output terminal, or alternatively, the output point $S_2$ of the second stage to the same high DC voltage output terminal.

7. The generator according to claim 1, wherein N is equal to three and wherein the transformer (42) has three primary windings (68-70) connected in a delta configuration, each primary winding being connected to a respective phase of the polyphase current delivered by the current switch unit (40), and wherein the transformer has three secondary windings (92-94) connected in a star configuration, each secondary winding delivering a respective phase of the polyphase high voltage.

8. The generator according to claim 1, wherein the time interval (Δt) between the instant when a switch (74, 76) of a top branch or a bottom branch passes from the off state to the on state and the instant when a switch of another top or bottom branch, as the case may be, passes from the on state to the off state is less than:

$$\frac{1}{3f_0N}.$$

9. The generator according to claim 2, wherein the fundamental frequency f0 is greater than 1 kHz.

10. The generator according to claim 3, wherein the fundamental frequency f0 is greater than 1 kHz.

11. A method of generating a high DC voltage with the help of a high DC voltage generator according to claim 1, the method being characterized in that it comprises:
causing (154) a switch (74) of a top half-branch to switch from the on state to the off state solely at an instant when a switch of another top half-branch is in the on state; and
causing (154) a switch (76) of a bottom half-branch to switch from the on state to the off state solely at an instant when a switch of another bottom half-branch is in the on state.

12. An electrostatic dust precipitator comprising:
a high DC voltage generator (24);
at least one electrode (14) suitable for ionizing dust present in smoke, the electrode being connected to the high voltage generator; and
at least one plate (16) suitable for attracting ionized dust, the plate being connected to a reference potential,
wherein said generator (24) is in accordance with claim 1.

* * * * *